United States Patent
Lindhé et al.

(10) Patent No.: US 9,811,089 B2
(45) Date of Patent: Nov. 7, 2017

(54) ROBOTIC CLEANING DEVICE WITH PERIMETER RECORDING FUNCTION

(71) Applicant: Aktiebolaget Electrolux, Stockholm (SE)

(72) Inventors: Magnus Lindhé, Stockholm (SE); Petter Forsberg, Stockholm (SE); Anders Haegermarck, Trångsund (SE)

(73) Assignee: AKTIEBOLAGET ELECTROLUX, Stockholm (SE)

( * ) Notice: Subject to any disclaimer, the term of this patent is extended or adjusted under 35 U.S.C. 154(b) by 0 days.

(21) Appl. No.: 15/101,257

(22) PCT Filed: Dec. 19, 2013

(86) PCT No.: PCT/EP2013/077384
§ 371 (c)(1),
(2) Date: Jun. 2, 2016

(87) PCT Pub. No.: WO2015/090402
PCT Pub. Date: Jun. 25, 2015

(65) Prior Publication Data
US 2016/0306359 A1   Oct. 20, 2016

(51) Int. Cl.
*G05D 1/02* (2006.01)
*A47L 11/40* (2006.01)

(52) U.S. Cl.
CPC ........ *G05D 1/0221* (2013.01); *A47L 11/4011* (2013.01); *G05D 1/0231* (2013.01);
(Continued)

(58) Field of Classification Search
CPC .. G05D 1/0221; G05D 1/0231; G05D 1/0248; G05D 1/0251; G05D 1/0274
(Continued)

(56) References Cited

U.S. PATENT DOCUMENTS

| 1,286,321 A | 12/1918 | Hoover |
| 1,401,007 A | 12/1921 | Staples |

(Continued)

FOREIGN PATENT DOCUMENTS

| CA | 2154758 | 6/1995 |
| CN | 1116818 | 2/1996 |

(Continued)

OTHER PUBLICATIONS

International Search Report for International Application No. PCT/EP2013/067500 dated Dec. 10, 2013, 4 pages.
(Continued)

*Primary Examiner* — Yazan Soofi
(74) *Attorney, Agent, or Firm* — RatnerPrestia

(57) ABSTRACT

The invention relates to a robotic cleaning device having a main body, a cleaning portion configured to clean a floor of an area of interest, and a propulsion system configured to move the robotic cleaning device across a surface of the area. The robotic cleaning device may further include an obstacle detecting device and a processing unit, the processing unit being configured to control the propulsion system, wherein the obstacle detecting device is configured to monitor a perimeter of at least part of the area and to follow and continuously record a position of an object, while the object is moving along the perimeter. The processing unit is configured to create positional data of the perimeter out of the continuously recorded positions.

17 Claims, 4 Drawing Sheets

(52) U.S. Cl.
CPC ......... *G05D 1/0248* (2013.01); *G05D 1/0251* (2013.01); *G05D 1/0274* (2013.01); *A47L 2201/04* (2013.01); *G05D 2201/0203* (2013.01)

(58) Field of Classification Search
USPC ........................................................ 701/28
See application file for complete search history.

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |

(56) References Cited

U.S. PATENT DOCUMENTS

| | | |
|---|---|---|
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |

(56) References Cited

U.S. PATENT DOCUMENTS

| | | |
|---|---|---|
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |

(56) References Cited

U.S. PATENT DOCUMENTS

| | | |
|---|---|---|
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 * | 8/2013 | Chiappetta ........... G05D 1/0272 180/167 |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,732,895 B2 | 5/2014 | Cunningham |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,924,042 B2 | 12/2014 | Kim |
| 8,961,695 B2 | 2/2015 | Romanov |
| 8,985,127 B2 | 3/2015 | Konandreas |
| 9,033,079 B2 | 5/2015 | Shin |
| 9,037,396 B2 | 5/2015 | Pack |
| 9,144,361 B2 | 9/2015 | Landry |
| 9,360,300 B2 * | 6/2016 | DiBernado |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |

(56) References Cited

U.S. PATENT DOCUMENTS

| | | |
|---|---|---|
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1* | 1/2006 | Taylor ............... A47L 9/009 700/245 |
| 2006/0028306 A1 | 2/2006 | Hukuba |
| 2006/0032013 A1 | 2/2006 | Kim |
| 2006/0045981 A1 | 3/2006 | Tsushi |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun |
| 2007/0114975 A1 | 5/2007 | Cohen |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077193 A1 | 3/2008 | Bow |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1* | 9/2008 | Lavarec ............... G05D 1/0219 700/245 |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0133720 A1 | 5/2009 | Van Den Bogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto et al. |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |

(56) References Cited

U.S. PATENT DOCUMENTS

| | | |
|---|---|---|
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1* | 4/2011 | Escrig .................. G05D 1/0246 703/1 |
| 2011/0088609 A1 | 4/2011 | Vosburgh |
| 2011/0109549 A1 | 5/2011 | Robbins |
| 2011/0131741 A1 | 6/2011 | Jones |
| 2011/0154589 A1 | 6/2011 | Reindle |
| 2011/0202175 A1* | 8/2011 | Romanov ........... A47L 11/4011 700/250 |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung et al. |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |

(56) References Cited

U.S. PATENT DOCUMENTS

| | | | |
|---|---|---|---|
| 2013/0253701 A1 | 9/2013 | Halloran | |
| 2013/0256042 A1 | 10/2013 | Rudakevych | |
| 2013/0268118 A1 | 10/2013 | Grinstead | |
| 2013/0269148 A1 | 10/2013 | Chiu | |
| 2013/0273252 A1 | 10/2013 | Miyamoto | |
| 2013/0298350 A1 | 11/2013 | Schnittman | |
| 2013/0310978 A1 | 11/2013 | Ozick | |
| 2013/0325178 A1 | 12/2013 | Jones | |
| 2013/0331987 A1 | 12/2013 | Karlsson | |
| 2013/0338525 A1 | 12/2013 | Allen | |
| 2013/0338828 A1 | 12/2013 | Chiappetta | |
| 2013/0338831 A1 | 12/2013 | Noh et al. | |
| 2014/0016469 A1 | 1/2014 | Ho | |
| 2014/0026339 A1 | 1/2014 | Konandreas | |
| 2014/0053351 A1 | 2/2014 | Kapoor | |
| 2014/0109339 A1 | 4/2014 | Won | |
| 2014/0123325 A1 | 5/2014 | Jung | |
| 2014/0130272 A1 | 5/2014 | Won | |
| 2014/0142757 A1 | 5/2014 | Ziegler | |
| 2014/0167931 A1 | 6/2014 | Lee | |
| 2014/0180968 A1 | 6/2014 | Song | |
| 2014/0207280 A1 | 7/2014 | Duffley | |
| 2014/0207281 A1 | 7/2014 | Angle | |
| 2014/0207282 A1 | 7/2014 | Angle | |
| 2014/0238440 A1 | 8/2014 | Dayton | |
| 2014/0249671 A1 | 9/2014 | Halloran | |
| 2014/0283326 A1 | 9/2014 | Song | |
| 2015/0005937 A1 | 1/2015 | Ponulak | |
| 2015/0032259 A1 | 1/2015 | Kim et al. | |
| 2015/0039127 A1 | 2/2015 | Matsumoto | |
| 2015/0057800 A1 | 2/2015 | Cohen | |
| 2015/0197012 A1 | 7/2015 | Schnittman | |
| 2015/0206015 A1 | 7/2015 | Ramalingam et al. | |
| 2016/0306359 A1* | 10/2016 | Lindhe | G05D 1/0221 |

FOREIGN PATENT DOCUMENTS

| | | |
|---|---|---|
| CN | 103027634 | 4/2013 |
| DE | 3536907 | 4/1986 |
| DE | 9307500 | 7/1993 |
| DE | 4211789 | 10/1993 |
| DE | 4340367 | 6/1995 |
| DE | 19849978 | 5/2000 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2296005 | 6/2011 |
| EP | 2251757 | 11/2011 |
| EP | 2417894 | 2/2012 |
| EP | 2438843 | 4/2012 |
| EP | 2561787 | 2/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2772815 | 9/2014 |
| FR | 2999416 | 6/2014 |
| GB | 2355523 | 4/2001 |
| GB | 2382251 | 5/2003 |
| GB | 2494446 | 3/2013 |
| GB | 1447943 | 10/2013 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63181727 | 7/1988 |
| JP | 63241610 | 10/1988 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 A | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 07129239 A | 5/1995 |
| JP | 07281742 | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002355204 | 12/2002 |
| JP | 2002366228 | 12/2002 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005124753 A | 5/2005 |
| JP | 2005141636 A | 6/2005 |
| JP | 2006087507 | 4/2006 |
| JP | 2006185438 A | 7/2006 |
| JP | 2006231477 | 9/2006 |
| JP | 2006314669 | 11/2006 |
| JP | 2007070658 | 3/2007 |
| JP | 2007213236 A | 8/2007 |
| JP | 2007226322 A | 9/2007 |
| JP | 2007272665 A | 10/2007 |
| JP | 2008146617 A | 6/2008 |
| JP | 2008290184 | 12/2008 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2011045694 | 3/2011 |
| JP | 2011253361 A | 12/2011 |
| JP | 2012216051 A | 11/2012 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 03022120 | 3/2003 |
| WO | 03024292 | 3/2003 |
| WO | 03026474 A2 | 4/2003 |
| WO | 2004082899 | 9/2004 |
| WO | 2007008148 | 1/2007 |
| WO | 2007028049 | 3/2007 |

(56) References Cited

FOREIGN PATENT DOCUMENTS

| WO | 2007051972 | 5/2007 |
|---|---|---|
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2015016580 | 2/2015 |

OTHER PUBLICATIONS

Notice of Allowance for U.S. Appl. No. 14/409,291, dated Jun. 16, 2016, 13 pages.
Written Opinion for International Application No. PCT/EP2013/067500 dated Dec. 10, 2013, 7 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory-Gainesville Florida, AAAI 1993 Fall Symposium Series-Research Triangle Park—Raleigh, NC, Oct. 22-24, 1993, pp. 1-6.
Everett, Sensors for Mobile Robots Theory and Application, A.K. Peters, 1995, Chapters 1 and 3, 70 pages.
Everett, Sensors for Mobile Robots Theory and Application, A.K. Peters, Ltd., 1995, Chapters, 4 and 5, 68 pages.
Everett, Sensors for Mobile Robots Theory and Application, A.K. Peters, Ltd., 1995, Chapters 6, 7 and 10, 79 pages.
Everett, Sensors for Mobile Robots Theory and Application, A.K. Peters, Ltd.,1995, Chapters 15 and 16, 59 pages.
Everett, et al. "Survey of Collision Avoidance and Ranging Sensors for Mobile Robots", Revision 1, Technical Report 1194, Dec. 1992, pp. 1-154.
Gavrilut, et al., "Wall-Following Method for an Autonomous Mobile Robot using Two IR Sensors", 12th WSEAS International Conference on SYSTEMS, Heraklion, Greece, Jul. 22-24, 2005, ISBN: 978-960-6766-83-1, ISSN: 1790-2769, pp. 205-209.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5 pages.
International Search Report for International Application No. PCT/EP2013/057815 dated Apr. 2, 2014, 4 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 6 and 9, 56 pages.
Jones et al., Mobile Robots Inspiration to Implementation, Second Edition, A.K. Peters, Ltd., 1999, Chapters 1 and 5, 72 pages.
Jones et al., Mobile Robots Inspiration to Implementation, Second Edition, A.K. Peters, Ltd., 1999, Chapters 10 and 11, 45 pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref, et al. "Sensor-based navigation of a mobile robot in an indoor environment", Robotics and Autonomous Systems, 2002, Elsevier, 18 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.

(56) References Cited

OTHER PUBLICATIONS

Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Michael Carsten Bosse, "Atlas: A Framework for Large Scale Automated Mapping and Localization", Massachusetts Institute of Technology, Feb. 2004, Part 1, 140 pages.
Michael Carsten Bosse, "Atlas: A Framework for Large Scale Automated Mapping and Localization", Massachusetts Institute of Technology, Feb. 2004, Part 2, 67 pages.
Non Final Office Action for U.S. Appl. No. 15/100,667, dated Sep. 12, 2016, 24 pages.
International Search Report and Writtent Opinion of the International Searching Authority for International Application No. PCT/EP2014/078144, 7 pages.
International Search Report and Written Opinion of the International Searching Authority for International Application No. PCT/EP2014/069073, dated May 12, 2015, 10 pages.
International Search Report and Written Opinion of the International Searching Authority for International Application No. PCT/EP2014/069074, dated May 11, 2015, 9 pages.
Non Final Office Action for U.S. Appl. No. 14/409,291, dated Dec. 28, 2016, 61 pages.
Extended European Search Report for European Application No. 16176479.0, dated Nov. 11, 2016, 9 pages.
Japanese Office Action for Japanese Application No. 2016-506795, dated Feb. 7, 2017 with translation, 6 pages.
Chinese Office Action for Chinese Application No. 20130075510.9, dated Feb. 6, 2017 with translation, 14 pages.
Japanese Office Action for Japanese Application No. 2016-506794, dated Feb. 7, 2017 with translation, 10 pages.
Chinese Office Action for Chinese Application No. 201380075503.9, dated Febraury 13, 2017 with translation, 18 pages.
Interational Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19 pages.
International Search Report and Written Opinion of the International Searching Authority for Internatonal Applicaion No. PCT/EP2014/0077142, dated Sep. 11, 2015, 8 pages.
Chung et al., "Path Planning For A Mobile Robot With Grid Type World Model", Proceedings of the 1992 IEEE/RSJ International Conference on Intelligent Robots and Systems, Jul. 7-10, 1992, pp. 439-444.
Non Final Office Action for U.S. Appl. No. 15/101,235 dated Apr. 21, 2017, 10 pages.
Final Office Action for U.S. Appl. No. 15/100,667, dated Apr. 21, 2017, 26 pages.
Non Final Office Action for U.S. Appl. No. 15/101,212, dated May 17, 2017, 8 pages.
Final Office Action for U.S. Appl. No. 14/409,291, dated Jun. 6, 2017, 21 pages.
Japanese Office Action forApplication for Japanese Application No. 2015-528969, dated Apr. 7, 2017 with translation, 4 pages.
Non Final Office Action for U.S. Appl. No. 15/102,015, dated Aug. 17, 2017, 13 pages.
International Search Report and Written Opinion of the International Searching Authority for International Application No. PCT/EP2015/058377, dated Aug. 10, 2016, 15 pages.
Notice of Allowance for U.S. Appl. No. 14/409,291, dated Sep. 18, 2017, 8 pages.
Notification of Reasons for Refusal for Japanese Application No. 2016-526764, dated Aug. 25, 2017 with translation, 6 paes.
Notification of Reasons for Refusal for Japanese Application No. 2016-526765, dated Aug. 25, 2017 with translation, 7 pages.
Notifcation of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.

\* cited by examiner

ROBOTIC CLEANING DEVICE WITH PERIMETER RECORDING FUNCTION

TECHNICAL FIELD

The invention relates to a robotic cleaning device and a method of teaching the robotic cleaning device a perimeter of at least part of an area.

BACKGROUND

Robotic vacuum cleaners are known in the art. In general robotic vacuum cleaners are equipped with a drive arrangement in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners can freely move around and clean a space or area in the form of e.g. a room.

In many fields of technology, it is desirable to use robots with an autonomous behaviour such that they can freely move around a space without colliding with possible obstacles and walls or the like, which limit a perimeter of a room.

As an a example, robotic vacuum cleaners exist in the art with the capability of more or less autonomously vacuum cleaning a room in which furniture such as tables and chairs and other obstacles such as walls and stairs are located. Traditionally, these robotic vacuum cleaners have navigated a room by means of using e.g. ultrasound or light waves or laser beams. These means of ultrasound, light waves or laser beams enable the robotic vacuum cleaner to see and avoid driving straight into walls and other obstacles. Further, the robotic vacuum cleaners must typically be complemented with additional sensors, such as stair sensors, wall-tracking sensors and various transponders to perform accurately. Such sensors are expensive and affect the reliability of the robot. Another way may be to install boundary or perimeter markers as it is known from robotic lawnmowers. This is however cumbersome and requires some time from the user prior to using the robotic vacuum cleaner.

A large number of prior art robotic vacuum cleaners use a technology referred to as Simultaneous Localization and Mapping (SLAM). SLAM is concerned with the problem of building a map of an unknown environment by a mobile robotic vacuum cleaner while at the same time navigating the environment using the map. This is in some cases combined with a horizontal scanning laser for range measurement. Further, odometry is used to provide an approximate position of the robot as measured by the movement of the wheels of the robot. SLAM and odometry in combination result in a cumbersome and long process for the robotic vacuum cleaner to adapt and learn the room or area it is operating in. Thus the first few cleaning processes may take a long time comprising quite some inefficiencies such as driving from one edge of the room to another edge without much of a plan how the cleaning process should be done. In addition double cleaning moves, which means that certain regions are cleaned twice during the same cleaning process, may occur.

US 2002/0091466 discloses a mobile robot with a first camera directed toward the ceiling of a room for recognizing a base mark on the ceiling and a line laser for emitting a linear light beam toward an obstacle, a second camera for recognizing a reflective linear light beam from the obstacle. The line laser emits a beam in the form of straight line extending horizontally in front of the mobile robot.

The use of a base mark on the ceiling and markers on the ceiling in general poses certain disadvantages. First, the robot will need to have two cameras with at least one camera "looking" up towards the ceiling and another camera looking in the direction of movement and thus in the direction of the laser beams from the horizontal line laser. This is expensive and complicates the build up of the robot.

Further, the user has to position at least one base mark on the ceiling by using a chair or ladder.

In addition the robot disclosed in US 2002/0091466 uses the base mark on the ceiling for determining its location and thus for the mapping and it requires the help of the ceiling marker to achieve an effective cleaning pattern and an effective cleaning process. In addition in case the room or area is large, the user may have to install more than one base mark on the ceiling so that the robot does not get lost.

The robot described in the above mentioned prior art is thus not as autonomous as it could be and it has at least the mentioned disadvantages.

SUMMARY

In view of the above stated disadvantages, it is an object of the present invention to provide a robotic cleaning device that is autonomous and effective.

A further object is to provide a robotic cleaning device that can be set up intuitively and in a simple manner.

Another object of the invention is to provide a robotic cleaning device that is economic.

Another object of the invention is to provide a method, which facilitates the installation and the starting up phase of the robotic cleaning device.

Disclosed herein is method of teaching a robotic cleaning device a perimeter of an area of interest, comprising the steps of positioning the robotic cleaning device so that an obstacle detecting device of the robotic cleaning device can monitor at least part of the area, controlling the obstacle detecting device of the robotic cleaning device to follow and continuously record a position of an object, while the object is moving along the perimeter of at least part of the area; and creating positional data of the perimeter from the continuous recordings of the positions of the object.

The method has the advantage that the robotic cleaning device can be intuitively set up by a user.

The area may be labelled as "clean this area", "clean this area every time", "clean this area every second time", "clean this area once a week" and/or "do not clean this area". The robotic cleaning device may be fed with instructions accordingly, for example via a user interface.

For example, in case a thick carpet is placed within the area, a user may teach the robotic cleaning device not to clean the carped in order to avoid getting stuck. On the other hand, regarding the kitchen the user may set the instructions to "clean once a day" since the kitchen may be more dirty than other sub-areas or areas.

Further, in case the layout of an area has changed, for example due to moving of furniture, the user may teach the robotic cleaning device the "new" area or positional data and thereby reset the positional data of the "old" area.

The robotic cleaning device may be put into a teaching mode via an interface or the like in order to record the perimeter of the area or at least part of the area. After the recording and creating of positional data is done, the robotic cleaning device may be switched to a cleaning mode, in which it is configured to clean the surface of at least part of the area. The teaching phase may be finished by confirming this to the robotic cleaning device via a user interface.

Once the robotic cleaning device starts the cleaning process, it may start to move efficiently from the beginning, since it now knows the area and its perimeter, because of the recorded map of the perimeter.

Another step of the method may comprise the step of switching the robotic cleaning device into a cleaning mode, for example via the user interface.

The switching into cleaning mode may help the user to better communicate with the robotic cleaning device. It may be clear for the robotic cleaning device what it is supposed to do at what time and to make a clear distinction between teaching- and cleaning phase.

The above described steps of the method may be performed for another perimeter and afterwards the recorded perimeters may be combined and positional data, such as a map, a layout or a floor plan of the area, may be created from the combined perimeters.

This may be useful when the area is large or when it is complex and comprises a lot of edges and corners.

The area to be cleaned may thus be divided into a plurality of sub areas.

Alternatively the area may itself form a sub area of a larger surface.

The previously mentioned step may be repeated for various perimeters until the entire area is covered and positional data of the whole area may be generated.

Thus the robotic cleaning device may be used in a flexible and versatile manner.

The map may be labelled via the user interface of the robotic cleaning device after the recording of the perimeters and the creation of the positional data.

The robotic cleaning device may be configured to combine and remember various maps of different areas and thus the maps may be named for example "hallway", or "kitchen" or "living room", etc.

Disclosed herein is further a robotic cleaning device comprising a main body, a cleaning portion configured to clean a floor of an area of interest and a propulsion system configured to move the robotic cleaning device across the area of interest and an obstacle detecting device comprising a processing unit. The processing unit may be configured to control the propulsion system, wherein the positioning system is configured to monitor a perimeter of at least part of the area and to follow and continuously record a position of an object, while the object is moving along the perimeter to be cleaned. The processing unit may additionally be configured to create positional data of the perimeter out of the continuously recorded positions.

Such a robotic cleaning device is easy to set up, it works fast and efficient from the first cleaning operation or process and it eases the handling for the user. This may, in addition, allow to intuitively set up the robotic cleaning device.

The obstacle detecting device may be embodied in the form of a 3D sensor system.

The 3D sensor system may be embodied in the form of a camera system, a 3D camera system, infrared (IR) sensors and/or sonar sensors, a microwave radar, a laser scanner, etc. for detecting obstacles and communicating information about any detected obstacle to the processing unit.

The robotic cleaning device as described above may operate efficiently from the beginning without a long lasting phase during which it learns the room or area and builds up the positional data, such as a map, a layout or a floor plan of the area, while doing so.

The obstacle detecting device may comprise a 3D sensor system.

3D sensor system may comprise a camera device arranged to record images of a vicinity of the robotic cleaning device and a first and second vertical line laser arranged to illuminate said vicinity of the robotic cleaning device. The processing unit may further be arranged to derive the positional data from the recorded images.

The camera device and the 3D sensor system, respectively facilitates recognition of the moving object and it allows keeping track of it. The camera device may be configured to take a plurality of images per second so that it is easy for the camera system to keep track of the moving object.

The moving object may move with a speed of 0.5 m/s to 2.5 m/s.

From the images specific characteristics may be derived in order to determine the exact position of the moving object and to create positional data of the perimeter via the 3D sensor system.

The processing unit may be configured to extract said characteristics from the images, for example via a suitable computer program product.

The line laser may improve the quality of the images taken the camera device and thus they improve the results of the continuous recordings of the positions of the moving object.

In an embodiment the processing unit may be configured to control the propulsion system in a manner so that the robotic cleaning device turns more or less on the spot, while the obstacle detecting device is observing the object, which moves along the perimeter.

The robotic cleaning device may thus not drive around during the teaching phase; it may be positioned steadily but with the ability to turn in order to keep track of the moving object. The line laser may be a vertical line laser. The robotic cleaning device is configured to be stationary.

Alternatively to the robotic cleaning device that is turning, the positioning system and the obstacle detecting device may be connected, preferably to the top of, the main body of the robotic cleaning device in a rotatable manner, so that it can observe the object, which moves along the perimeter, by rotating while the main body of the robotic cleaning device is stationary.

Thus it may be possible to provide the robotic cleaning device with a rotatable positioning system and obstacle detecting device, respectively, so that it can keep track of the moving object.

In an embodiment the robotic cleaning device may comprise a user interface for communication with a user.

A user interface may improve the communication between a user and the robotic cleaning device.

The moving object may be the user itself.

In order to be recognizable, the user may carry a special piece of cloth, such as a reflective vest or the like.

This makes the teaching phase even more intuitive.

The moving object may be a marker such as a reflector or a sending device, which may be carried by a user, while the user is following the perimeter.

The sending device may be an ultrasound device, a radio device, an infrared device or any other device suitable to establish a communication with a receiver of the robotic cleaning device.

In case a sending device is used, the receiver may be installed in the robotic cleaning device, said receiver being connected to the processing unit.

A further aspect of the invention relates to a computer program comprising computer-executable instructions for causing a robotic cleaning device to perform the above mentioned steps, when the computer-executable instructions are executed on the processing unit.

Another aspect of the invention relates to a computer program product comprising a computer readable storage medium, which comprises the computer program therein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner or a robotic floor washer or mop. The robotic cleaning device 1 according to the invention can be mains-operated and have a cord, be battery-operated and powered or use any other kind of suitable energy source, for example solar energy.

Figure 1:
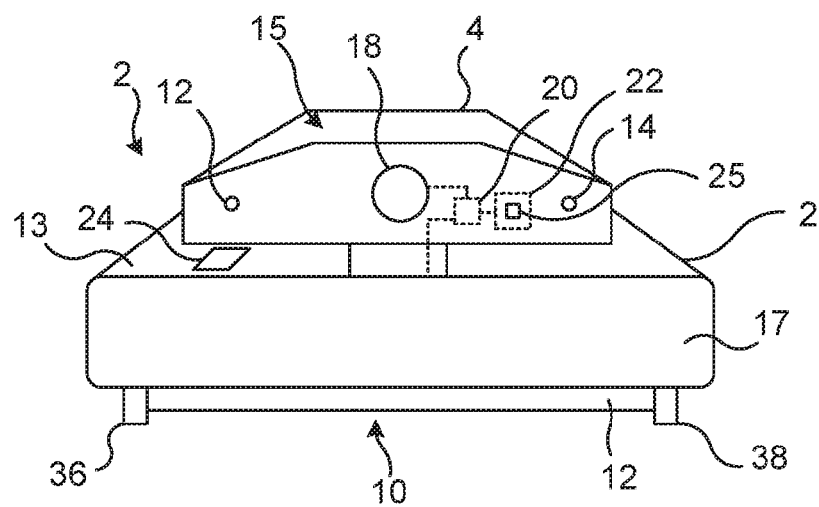
FIG. 1 schematically illustrates a perspective view of an embodiment of the robotic cleaning device according to the invention.
Figure 2:
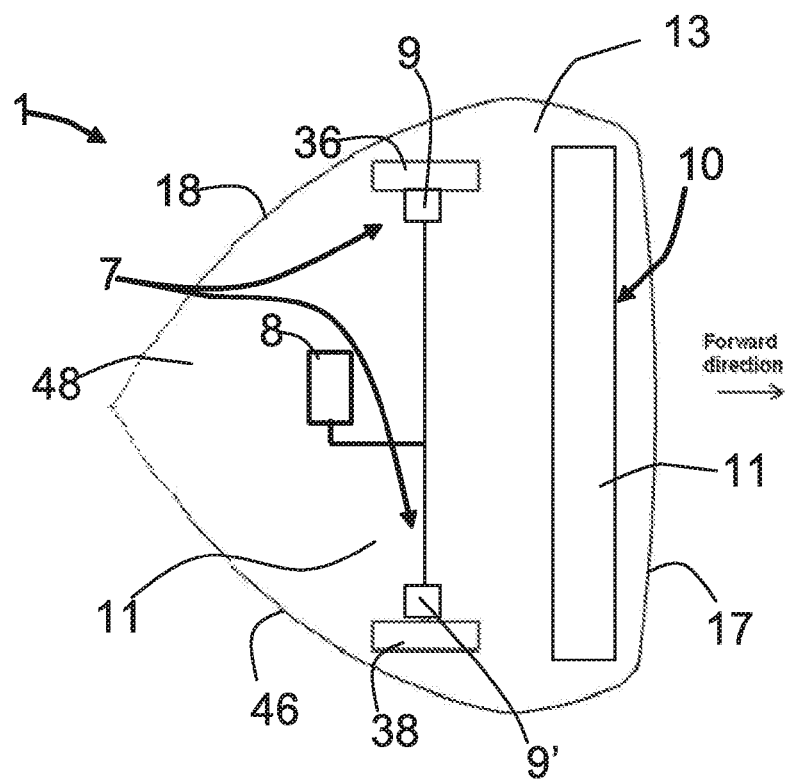
FIG. 2 schematically illustrates a bottom up view of a robotic cleaning device according to the invention.

Referring now to the figures, in particular to FIGS. 1 and 2, an exemplary embodiment of a robotic cleaning device 1 comprising a main body 2 and a positioning system 4 is illustrated. The main body 2 comprises a propulsion system 7, 8, and a cleaning member 10 with a nozzle element, a cleaning opening or a cleaning portion 11. The positioning system 4 comprises a first vertical line laser 12 and a second vertical line laser 14, an obstacle detecting device, a processing unit 20 and a user interface 24. The processing unit 20 comprises a storage medium 22 with a computer program product 25, as illustrated in FIG. 1.

The obstacle detecting device may be embodied in the form of a 3D sensor system 15 comprising the first and second vertical line lasers 12, 14.

The 3D sensor system may be embodied in the form of a laser scanner, a camera, a radar, a 3D camera system, a camera in combination with line lasers, an infrared scanner, etc.

Figure 5:
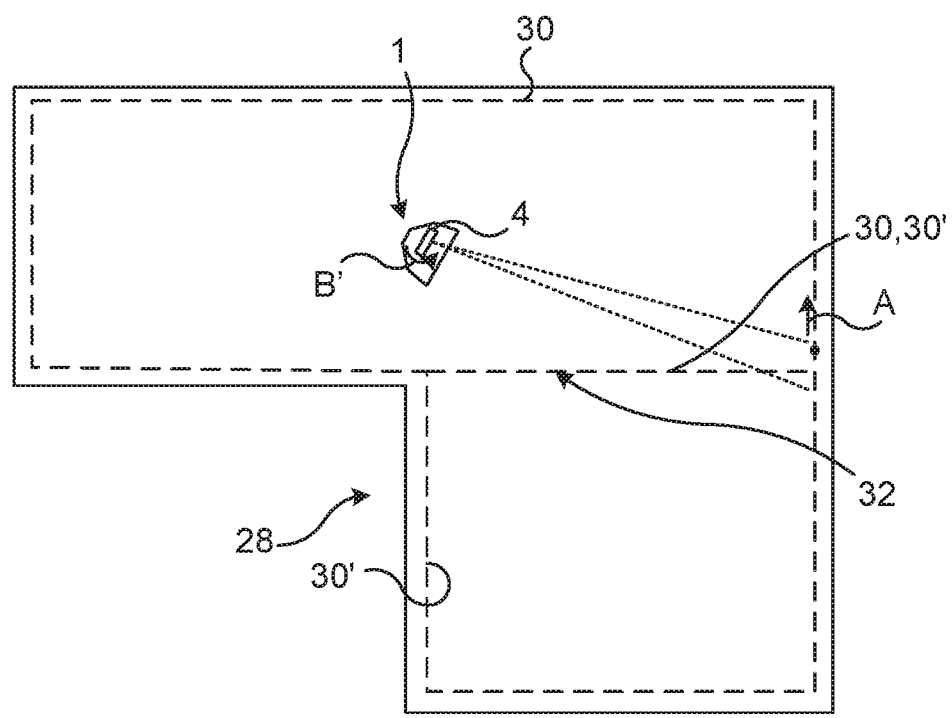
FIG. 5 schematically illustrates a similar view as FIGS. 3 and 4, illustrating a robotic cleaning device according to the invention positioned in a further area.

FIG. 1 illustrates the positioning system 4 mounted on top of the main body 2 of the robotic cleaning device 1. In this case the positioning system 4 is fixedly mounted to the main body 2 so that the 3D sensor system 15 generally looks in the forward direction (c.f. FIG. 2) of the robotic cleaning device. Alternatively the positioning system 4 may be rotatably mounted on the main body 2 (c.f. FIG. 5). This may require a driving mechanism configured to drive the rotation (clockwise and counter clock-wise) of the positioning system 4. The driving mechanism may be connected to the processing unit 20 and control means, respectively, since the processing unit 20 or control arrangement may drive the rotating movement of the positioning system 4. The positioning system 4 may also comprise a user interface 24 for improving communication between the robotic cleaning device 1 and the user.

With respect to FIG. 1, for illustrational purposes, the obstacle detecting device and the positioning system 4, respectively and the 3D sensor system 15 is separated from the main body 2 of the robotic cleaning device 1. However, in a practical implementation, the 3D sensor system 15 is likely to be integrated with the main body 2 of the robotic cleaning device 1 to minimize the height of the robotic cleaning device 2, thereby allowing it to pass under obstacles, such as e.g. a sofa.

The propulsion system 7, 8 of the robotic cleaning device 1, as best illustrated in FIG. 2, may comprise a driving mechanism 7, the drive arrangement 8 and driving wheels 36, 38. The driving wheels 36, 38 may be configured to be moved independently form each other via drives 9, 9' of the drive arrangement 8. Each of the driving wheels 36, 38 may comprise a drive 9, 9'. The driving arrangement 8 and thus the two the drives 9, 9' may be connected to the processing unit 20 or control means. Each drive 9, 9' may further include a suspension for the according driving wheel 36, 38 and a gear box.

Alternatively, the propulsion system 7, 8 may be embodied in the form of a crawler system, a hoover craft system or as illustrated with a drive arrangement 8 comprising drives 9, 9' and driving wheels 36, 38.

With further reference to FIG. 1, the processing unit 20 embodied in the form of one or more microprocessors is arranged to execute a computer program 25 downloaded to a suitable storage medium 22 associated with the microprocessor, such as a Random Access Memory (RAM), a Flash memory or a hard disk drive. The processing unit 20 is arranged to carry out a method according to embodiments of the present invention when the appropriate computer program 25 comprising computer-executable instructions is downloaded to the storage medium 22 and executed by the processing unit 20. The storage medium 22 may also be a computer program product comprising the computer program 25. Alternatively, the computer program 25 may be transferred to the storage medium 22 by means of a suitable computer program product, such as a digital versatile disc (DVD), compact disc (CD) or a memory stick. As a further alternative, the computer program 25 may be downloaded to the storage medium 22 over a network. The processing unit 20 may alternatively be embodied in the form of a digital signal processor (DSP), an application specific integrated circuit (ASIC), a field-programmable gate array (FPGA), a complex programmable logic device (CPLD), etc.

FIG. 2 illustrates one of the possible shapes of the robotic cleaning device 1. Such a shape may improve the ability of the robot to reach into corners and edges. The main body 2 of this robotic cleaning device has a front end portion 13 with a front end periphery 17, a rear end portion 48, a right side periphery 44 connecting the front end periphery 17 and the rear end portion 48 and a left side periphery 46 connecting the front end periphery 17 and the rear end portion 48.

The front end portion 13 of the main body 2 of the robotic cleaning device 1 is the portion of the main body 2 located between drive shaft 40 and a front end periphery 17. The front end portion 13 may be essentially quadrilateral-shaped, possibly with slightly rounded corners where the front end periphery 17 meets the right side periphery 44 and the left side periphery 46, respectively. The front end periphery 17 is flat/straight or slightly curved as shown in FIG. 2 in order to reach far into corners.

Other types of robotic cleaning devices having a round or circular shape may also be configured to perform or operate according to the invention.

The front end portion 13 may additionally comprise a bumper (not shown). The bumper may be configured to be replaceable.

A rotating brush (not shown) may be arranged on a protruding portion of the main body 2. The rotating brush may rotate to move debris towards the opening 11 or nozzle element of the cleaning member 11. The brush may be configured and positioned on the protruding member so that it extends over the periphery of the main body 2 and/or bumper.

The cleaning portion 10 may further comprise a nozzle or opening and a suction fan that sucks debris form the cleaning portion 11 into a debris container.

Alternatively the cleaning portion 11 may be a sweeping brush or a floor mop.

Figure 6:
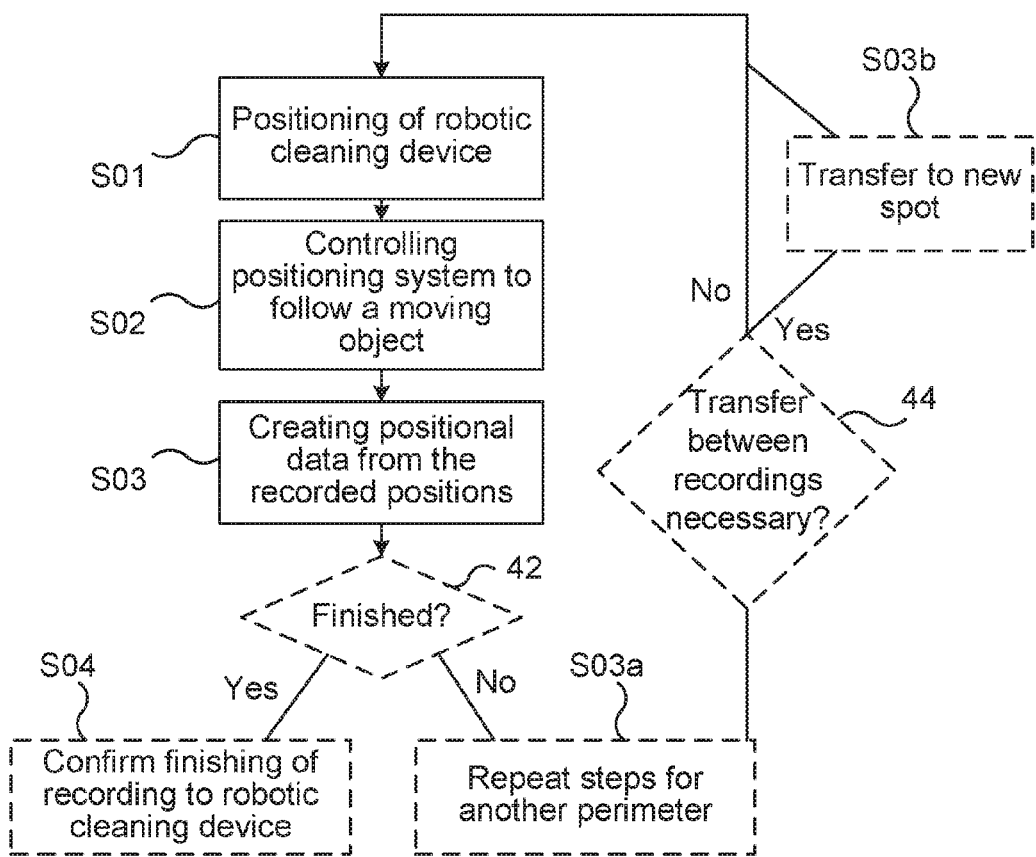
FIG. 6 illustrates a flow chart according to a method of the present invention.

FIG. 6 illustrates method steps according to a method of the invention performed by the robotic cleaning device according to the invention. The method relates to the teaching of a perimeter 30 or perimeters 30, 30' of an area 28 or at least part of an area. The robotic cleaning device 1 may be positioned S01 so that it can observe or monitor at least a part of the area 28 to be cleaned. This may be within or outside of the area 28 and the perimeter 30, 30' respectively. The robotic cleaning device 1 may be configured to position itself automatically so it can monitor the perimeter 30, 30' or alternatively it may be positioned by the user accordingly. The monitoring may be performed by the positioning system 4 via the obstacle detecting device/the 3D sensor system 15 and the first- and second vertical line lasers 12, 14. The 3D sensor system may comprise a camera device 18 configured to record images, which are illuminated by the vertical line laser 12, 14. After the positioning, the positioning system 4 and the obstacle detecting device, respectively, may be controlled S02 to follow and continuously record a position of an object 34, while the object is moving along the perimeter 30 of at least part of the area 28 to be cleaned. The processing unit 20 and the storage medium 22 may be configured to store the continuous measured positions and create S03 a map from the continuous recordings of positions of the moving object 34.

The method may optionally include a first decision maker 42 where it is decided whether the positioning system 4 and the obstacle detecting device and thus the 3D sensor system, respectively, should record another perimeter 30' or whether the recording is finished.

When the recording is finished a user may confirm this to the robotic cleaning device via a user interface 24, arranged on the main body 2 of the robotic cleaning device 1. Alternatively the robotic cleaning device 1 may generate this confirmation automatically as later on disclosed herein. After the confirmation the processing unit 20 may then generate a map based on the recorded positions of the moving object 34.

Alternatively, in case the recording is continued S03a, the steps of positioning S01, controlling S02 and creating S03 are repeated until the entire area 28 to be cleaned is covered. The user may confirm to the robotic cleaning device 1 when the recording is done and the robotic cleaning device 1 may then combine the recorded maps in order to generate a map of the entire are 28. This may e useful when large areas 28 to be cleaned are mapped.

Using an interface 24 may ease the set up of the robotic cleaning device 1, it is however not necessary to perform the invention. Other means of communication between user and the robotic cleaning device 1, such as visual signs or the like may be applied.

The moving object 34 may for example be the user him/herself, a reflector or a sending device such as infrared or radio transmitter carried by the user. In order to improve the recognition of the user she/he may carry a reflecting vest or the like.

The robotic cleaning device 1 may have two modes of operation, a teaching mode, in which the robotic cleaning device 1 learns the perimeters 30, 30' and generates the map of the perimeters 30, 30' and finally the area 28 to be cleaned and a cleaning mode in which it is configured to clean the area 28. This modes are however not essential to perform the method according to the invention. They may be used to improve communication between a user and the robotic cleaning device 1 and in order to improve clarity or in order to clearly distinguish between the two operating modi of the robotic cleaning device 1.

The user interface 24 may additionally be used to type in names, such as for example "kitchen", "bathroom" or "laundry room" of different recorded areas 28. The naming of areas 28 may be performed after confirming S04 the finishing of the recordings, as shown in FIG. 6.

Figure 3:
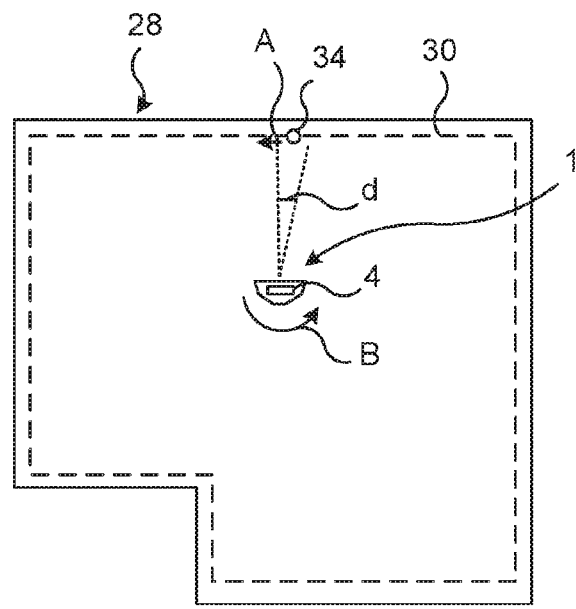
FIG. 3 schematically illustrates a robotic cleaning device according to the invention monitoring a perimeter of an area.
Figure 4:
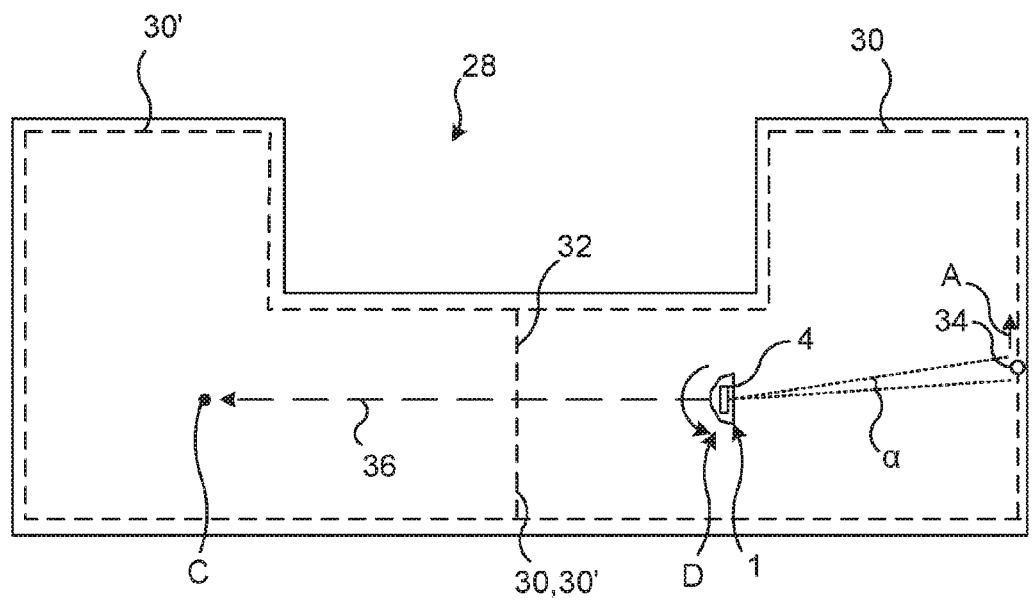
FIG. 4 schematically illustrates a similar view as FIG. 3 illustrating a robotic cleaning device according to the invention positioned in another area.

Referring now to FIGS. 3 to 5 various areas 28 to be cleaned are illustrated. In the examples shown in FIGS. 3 to 5, the robotic cleaning device 1 is continuously recording the positions of the moving object 34 while it is moving along the dashed line, which illustrates the perimeter 30.

Referring now to FIG. 3, the recording and teaching of a relatively simple area 28 to be cleaned is explained below. The robotic cleaning device 1 is positioned in a region of the area 28 from where it can observe and monitor the whole perimeter 30. In FIG. 3, the perimeter 30 is more or less the boundary of the area 28. The robotic cleaning device 1 may be configured to position itself automatically while following the moving object 34. Preferably the robotic cleaning device 1 turns on the spot, however small movements during the controlling and recording S02 are possible and do also fall under the scope of invention.

The moving object 34 is initially arranged within the angle of view of the 3D sensor system 15 of the positioning system 4 of the robotic cleaning device 1. Since the obstacle detecting device and the 3D sensor system 15 comprising a camera device 18 is configured to take a plurality of photos per second the processing unit 20 can generate commands for the propulsion system 7, 8 quickly, so quickly that the positioning system 4 and the obstacle detecting device, respectively, when the positioning system 4 and the obstacle detecting device, respectively, is rotatably mounted on the main body 2, are able to follow the movement path of the moving object 34 along the perimeter 30. The moving object 34 is following the perimeter 30 in a counter-clockwise direction A and thus the robotic cleaning device 1, the obstacle detecting device and the positioning system 4, respectively, are rotating or turning in the same direction B, namely counter-clockwise. Alternatively, the moving object 34 may move along the perimeter 30, 30' clockwise the obstacle detecting device and the positioning system 4 or the robotic cleaning device 1 may rotate or turn clockwise accordingly.

The robotic cleaning device 1 and the processing unit 20, respectively, may be configured to automatically recognize when the moving object 34 has completed a round along the perimeter 30 so that it may automatically stop the continuous recording of the positions and generate a map of the perimeter 30.

The robotic cleaning device 1 may be positioned or position itself within the area 28 or perimeter 30, 30' to be recorded or outside of the area 28 or perimeter 30, 30' to be recorded. The main criteria is that the obstacle detecting device the 3D sensor system 15 and thus the camera device 18 and the first and second line lasers 12, 14 can, at least more or less, see the entire perimeter 30 of the area 28. The dashed lines in FIGS. 3 and 4, illustratively show the angle α of view of the obstacle detecting device and the 3D sensor system 15, respectively.

The area 28 illustrated in FIG. 3 may be recorded and mapped by performing the steps S01-S03 once so that the confirmation of the continuous recording of the positions may be given to the robotic cleaning device as soon as the round of the moving object 34 along the perimeter 30 is completed.

FIG. 4 illustrates a larger area 28 to be cleaned having a different layout as the one shown in FIG. 3. In the area 28 according to FIG. 4, the obstacle detecting device and the 3D sensor system 15, respectively, cannot see the entire area 28 from a single spot within or outside the area 28, when it is assumed, that the outer boundary of the area 28 are walls of a house or the like. For this reason the method steps of positioning S01 the robotic cleaning device 1, controlling S02 the positioning system 4 and creating S03 a map have to be repeated, whereby in this special case, the robotic cleaning device 1 has to change position from spot D to spot C, since from these two spots D, C it can observe and monitor the entire area 28. The robotic cleaning device 1 will thus in this case decide that the recording is not yet finished 42 and proceed with repeating the method steps S01 to S03 for another perimeter 30'. Before doing so, a second decision maker 44 will demand if a transfer of the robotic cleaning device 1 from the current recording spot D to a new recording spot C is necessary (c.f. FIG. 6). In the example shown in FIG. 4, the processing unit 20 will decide, based on the images taken by the camera device 18, that a transfer along a transfer path 36 is necessary to record the other perimeter 30' for mapping the perimeter 30, 30' of the entire area 28. The transfer path 36 extends between a first spot D of recording and a second spot C of recording. In order to later on combine the generated maps, the transfer path 36 has to be remembered and stored by the processing unit 20 and the storage medium 22, respectively. Information such as length and direction of the transfer path 36 will be needed in order to generate a combined map out of the recorded maps later on.

When the robotic cleaning device 1 arrived in the second recording spot C it positions itself and performs the steps S01-S03 accordingly for the other perimeter 30'. Once this is done the two generated maps of the two perimeters are combined and a map of the entire area is generated. While generating the map of the entire area 28, the boundary line 32, which was used as an imaginary boundary between the two perimeters 30, 30' may be eliminated by the processing unit 20 and its computer program 25. Alternatively this boundary line 32 may remain and the robotic cleaning device 1 may clean the entire area 28 in two stages, first the one perimeter 30 and then the other perimeter 30'.

There may be more than two perimeters 30, 30' depending on the size of the area 28 and the amount of fixed obstacles within the area 28. The area 28 may be split up into as many perimeters as necessary. This split up or if a split up is necessary may either be decided by the user or by the robotic cleaning device 1. It is even possible that the robotic cleaning device 1 gives the user as moving object 34 instructions what to do and where to move next.

FIG. 5 illustrates a similar area 28 as FIG. 3 but this time the area 28 is divided into two perimeters 30, 30'. In this case the robotic cleaning device 1 does not have to move from a first spot D to a second spot C in between the recordings or performing of steps S01 to S03, since it is possible to monitor the whole area 28 from various spots or regions. In FIG. 5 it is further indicated, that the positioning system 4 and the 3D sensor system 15 of the robotic cleaning device 1 is able to rotate in order to follow the moving object 34, whereas in FIGS. 3 and 4, it is the whole robotic cleaning device 1 that was turning or rotating, for example by rotating the wheels 36, 38 in opposite directions. The positioning system 4 and the 3D sensor system 15 or the obstacle detecting device are thus following the moving object 34, while it is moving along the perimeters 30, 30', whereby the main body 2 of the robotic cleaning device 1 remains idle.

Again, after the first perimeter 30 has been recorded, the robotic cleaning device 1 generates a confirmation, since it will realize that the continuous recorded positions are overlapping after the round along the perimeter 30 has been completed.

The confirmation may alternatively be done manually by the user via the user interface 24.

The boundary line 32, as illustrated in FIG. 5, may also be eliminated by the processing unit 20 and the computer program 25 when the two perimeters 30, 30 are combined to generate a map of the entire area 28.

The processing unit 20 and the storage medium 22 may be configured to store and remember various maps of various areas 28 of an apartment or a house for example.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of teaching a robotic cleaning device a perimeter of an area of interest, comprising the steps of:
positioning the robotic cleaning device so that an obstacle detecting device of the robotic cleaning device can monitor at least part of the area;
controlling the obstacle detecting device of the robotic cleaning device to follow and continuously record a position of an object, while the object is moving along the perimeter of the area of interest; and creating positional data of the perimeter from the continuous recordings of the positions of the object.

2. The method according to claim 1 further comprising the step of finishing the teaching by signalling, via a user interface to the robotic cleaning device, that the recording of the perimeter is finished.

3. The method according to claim 1, further comprising the step of switching the robotic cleaning device into a cleaning mode via the user interface.

4. The method according to claim 1, further comprising performing the steps according to claim 1 for another perimeter, combining the recorded perimeters and creating positional data of the combined, recorded perimeters from the continuous recordings of the positions.

5. The method according to claim 4, wherein the step of claim 4 is repeated a plurality of times to cover an entire area.

6. The method according to claim 1, further comprising the step of labelling the positional data of the perimeter via the user interface.

7. A robotic cleaning device comprising:
a main body;
a cleaning portion configured to clean a floor of an area of interest;
a propulsion system configured to move the robotic cleaning device across the surface of the area; and
an obstacle detecting device comprising a processing unit, the processing unit being configured to control the propulsion system;
wherein the obstacle detecting device is configured to monitor a perimeter of the area and to follow and continuously record a position of an object, while the object is moving along the perimeter; and
wherein the processing unit is configured to create positional data of the perimeter out of the continuously recorded positions.

8. The robotic cleaning device according to claim 7, wherein the obstacle detecting device comprises a 3D sensor system.

9. The robotic cleaning device according to claim 8, wherein the 3D sensor system comprises:
a camera device arranged to record images of a vicinity of the robotic cleaning device; and
a first vertical line laser and a second vertical line laser arranged to illuminate the vicinity of the robotic cleaning device;
the processing unit further being arranged to derive the positional data from the recorded images.

10. The robotic cleaning device according to claim 9, wherein the processing unit derives a characteristic from the images in order to create positional data of the perimeter.

11. The robotic cleaning device according to claim 7, wherein the processing unit is configured to control the propulsion system in a manner so that the robotic cleaning device turns more or less on the spot, while the obstacle detecting device is observing the object, which moves along the perimeter.

12. The robotic cleaning device according to claim 7, wherein the obstacle detecting device is connected to the main body of the robotic cleaning device in a rotatable manner, so that it can observe the object, which moves along the perimeter, by rotation while the robotic cleaning device is stationary.

13. The robotic cleaning device according claim 7, further comprising a user interface for communication with a user.

14. The robotic cleaning device according claim 7, wherein the moving object is a user.

15. The robotic cleaning device according to claim 7, wherein the moving object is a marker such as a reflector or a sending device, the marker or sending device being configured to be carried by a user, while the user is following the perimeter.

16. A computer program comprising computer-executable instructions for causing a robotic cleaning device to perform the following method steps when the computer-executable instructions are executed on a processing unit included in the device, the method steps comprising:
positioning the robotic cleaning device so that an obstacle detecting device of the robotic cleaning device can monitor at least part of the area;
controlling the obstacle detecting device of the robotic cleaning device to follow and continuously record a position of an object, while the object is moving along the perimeter of the area of interest; and
creating positional data of the perimeter from the continuous recordings of the positions of the object.

17. The computer program of claim 16,
wherein the computer program is stored on a non-transitory computer readable storage medium.

* * * * *